Nov. 15, 1949  A. J. J. M. VAN DER KORPUT  2,487,908
APPARATUS FOR DETERMINING THE STRENGTH
OF PAPER AND OTHER FOLIACEOUS MATERIAL
Filed Oct. 2, 1946  5 Sheets-Sheet 1
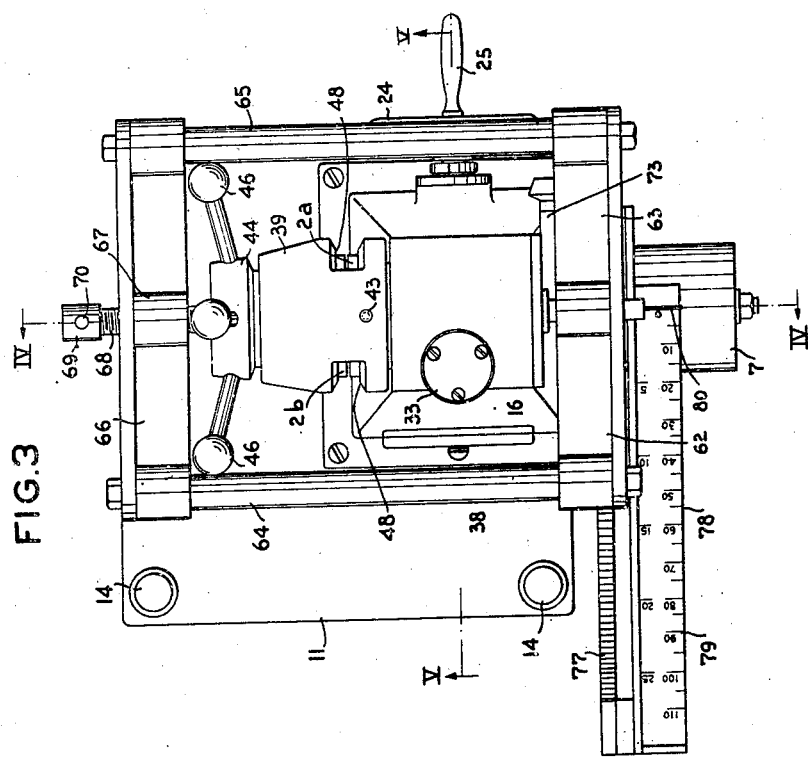
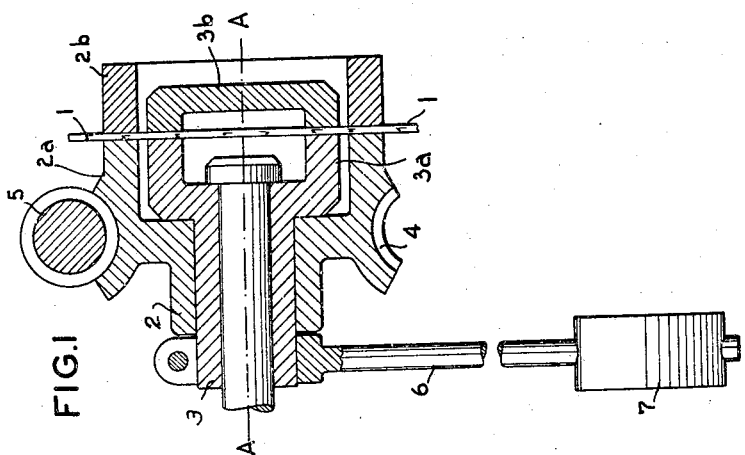

Nov. 15, 1949    A. J. J. M. VAN DER KORPUT    2,487,908
APPARATUS FOR DETERMINING THE STRENGTH
OF PAPER AND OTHER FOLIACEOUS MATERIAL
Filed Oct. 2, 1946                 5 Sheets–Sheet 2
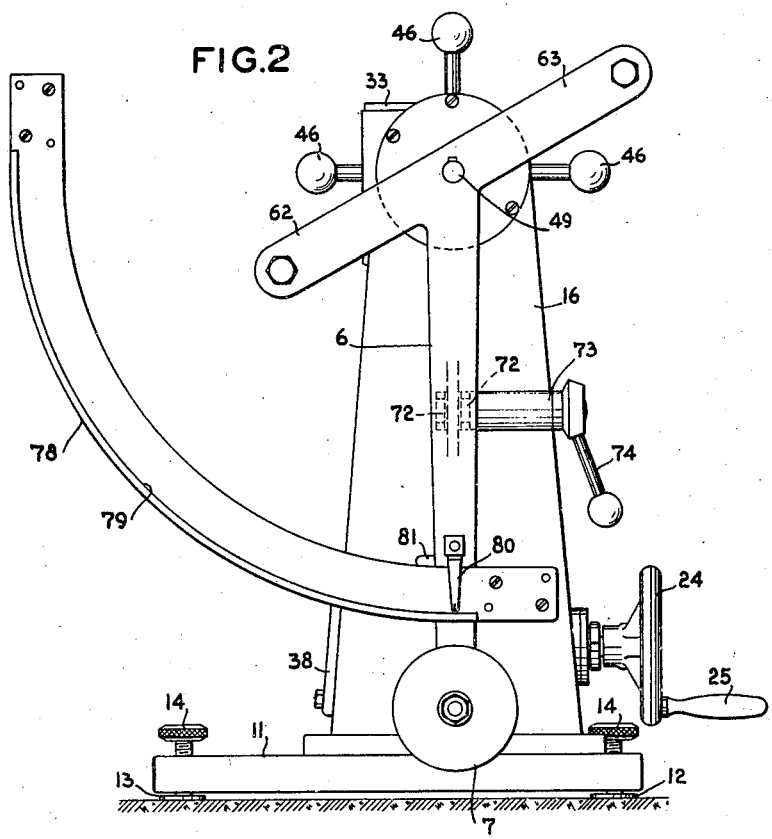
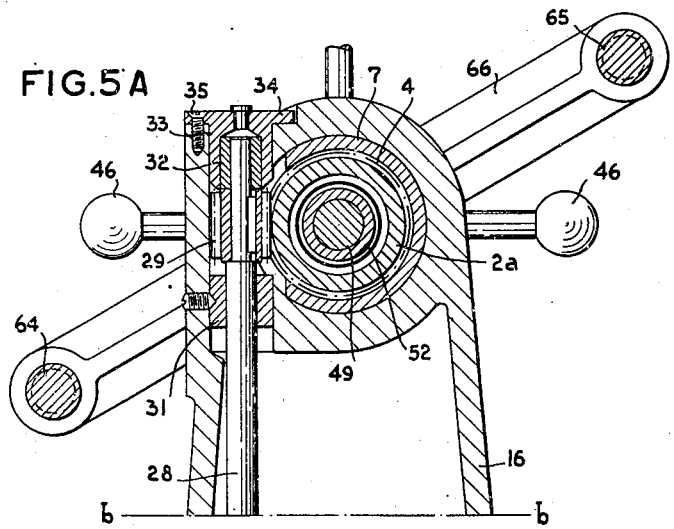

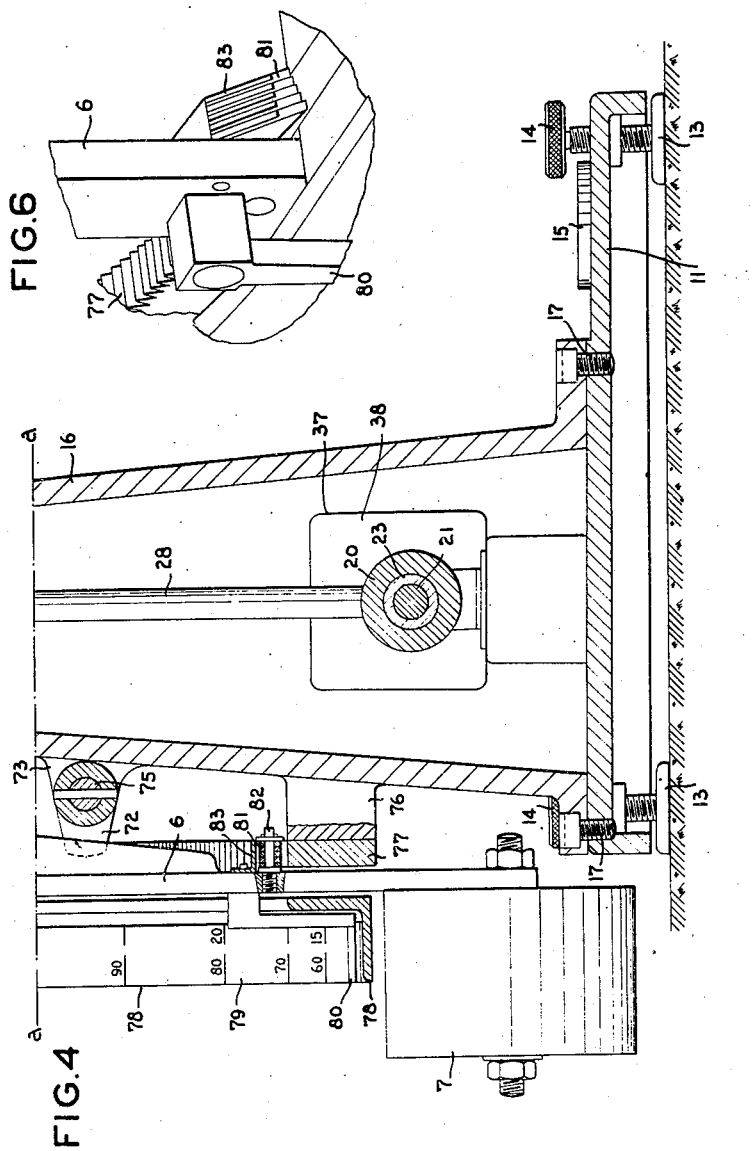

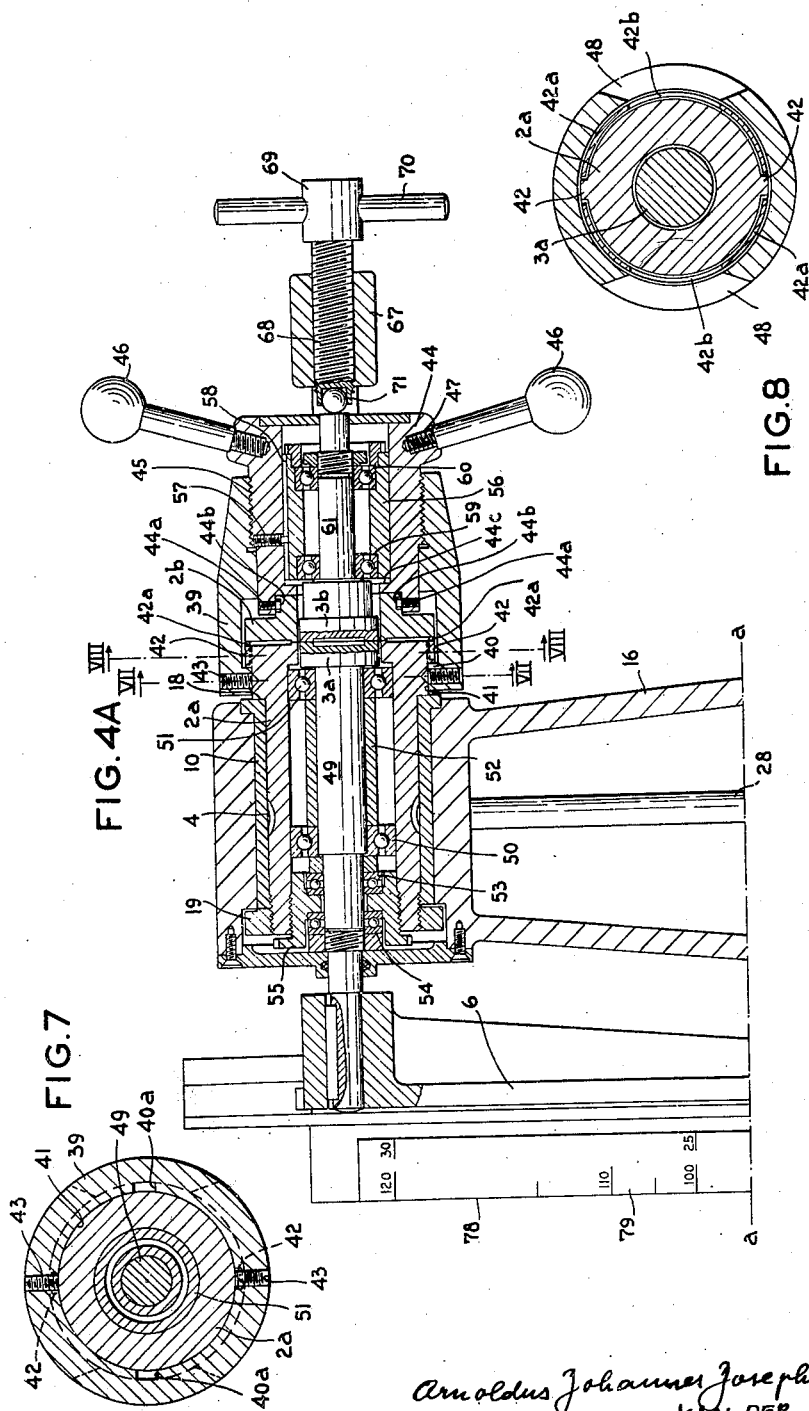

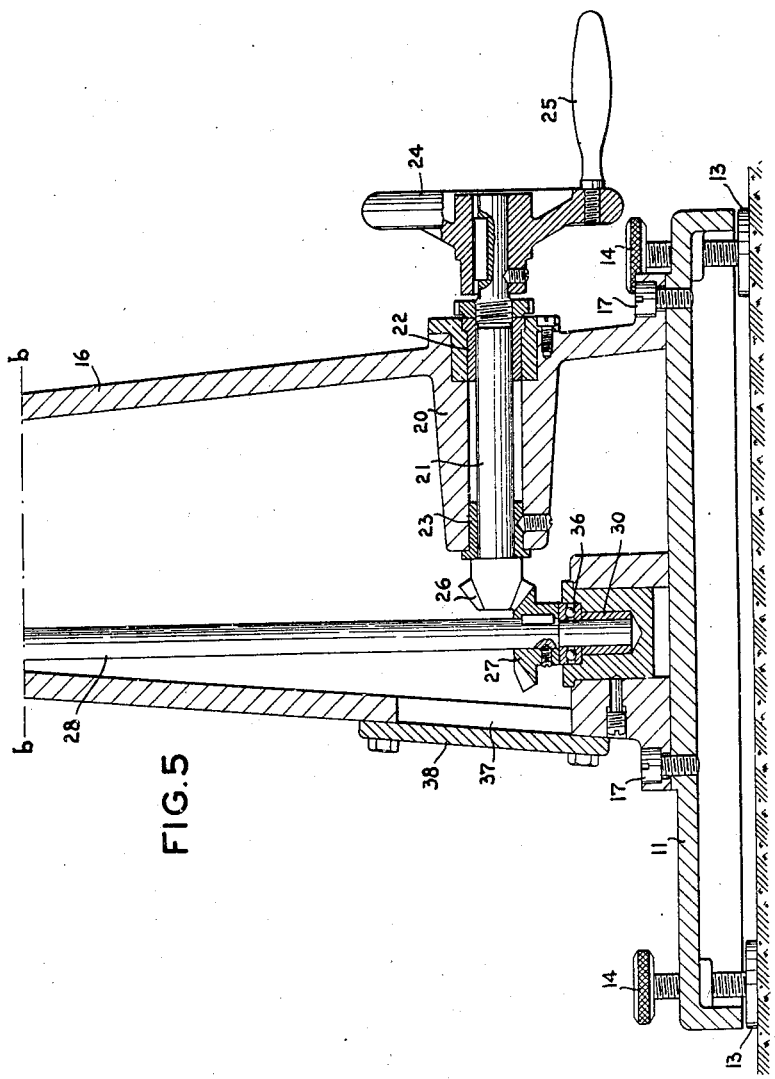

Patented Nov. 15, 1949

2,487,908

UNITED STATES PATENT OFFICE 2,487,908

APPARATUS FOR DETERMINING THE STRENGTH OF PAPER AND OTHER FOLIACEOUS MATERIAL

Arnoldus J. J. M. van der Korput, Baarn, Netherlands

Application October 2, 1946, Serial No. 700,773
In the Netherlands October 4, 1945

6 Claims. (Cl. 73—98)

This invention relates to an apparatus for determining the strength of paper and other foliaceous material.

The usual method for specifying the mechanical strength of paper and other foliaceous materials consists in indicating the tensile strength. In order to determine the tensile strength, a sample strip, e. g. of paper, with a width of 0.6 inch is generally clamped in clamps spaced 7 or 4 inches and thereupon it is subjected to a slowly increasing tensile stress, until the strip breaks. Then the maximum tensile load is read off at the instrument.

When testing different papers which have been manufactured on a paper machine it is usual to determine the tensile strength in the two main directions and to indicate both values separately. With a view to the considerable deviations of the single results it is necessary, in order to obtain reliable data, to make at least five tests in each of the main directions and to calculate the average result of these tests.

For the usual commercial paper the mean deviations of the separate tests often amount to 25% from the average value. Up to now there was a tendency to explain these deviations by the inequality of the paper. However, it has been proved lately that, even with paper of the best uniform quality, the differences of the separate tensile stress tests are so great, that the cause thereof can only for the smaller part be explained by the inequality of the samples, but it is the testing method itself which involves the inaccuracies.

The inexactitude of the method described hereabove for determining the tensile strength may be explained by the following factors:

1. The width of the sample strip is too small, so that irregularities in the texture of the paper have a relatively too great influence on the measuring results.

2. The total area of the test strip (viz. 4.2 or 2.4 sq. in. respectively) is too large and hence there is a great probability of particularly weak places.

3. The cut side-edges of the test strip contain a great many damaged and cut fibres which are not perpendicular to the longitudinal direction of the strip. The severance of such fibres involves a weakening of the strip at its edges.

4. It depends entirely of the skill of the operator of the testing apparatus whether the test strip is fixed in the clamps in the right way, viz. in such a way that the tensile stress is equal at both edges of the strip. If this is not the case, the tensile load is principally taken at that edge which is stressed tightlier, resulting in rupture of the strip at a lower load than would be the case if the tensile stress would have been distributed more equally over the strip.

The main object of the present invention is to provide a method and an apparatus for determining the strength of paper and other foliaceous material in which the sources of inexactitude, described hereabove, are avoided.

A further object of the invention is to provide an apparatus having means for reading off the force which is exerted at the moment of rupture of the sample.

Other objects will follow from the description of an apparatus according to the invention which has been illustrated by way of example in the accompanying drawings in which:

Fig. 1 is a diagrammatic section explaining the principle of the present invention.

Fig. 2 is a side elevation view of an apparatus for testing paper and other foliaceous material, embodying the principle shown in Fig. 1.

Fig. 3 is a top view.

Figs. 4 and 4a are combined a vertical section according to the line IV—IV in Fig. 3.

Figs. 5 and 5a are combined a vertical section, under right angles to Fig. 4, according to the line V—V in Fig. 3 and Fig. 6 is a perspective view of a detail.

Fig. 7 is a cross section according to line VII—VII in Fig. 4a;

Fig. 8 is a cross section according to the line VIII—VIII in Fig. 4a.

With reference to Fig. 1 the paper strip 1 to be tested is clamped in two clamps 2 and 3, each comprising two jaws 2a, 2b and 3a, 3b respectively. The jaws 2a of the outer clamp and 3a of the inner clamp are prevented from axial movement and their faces are exactly in the same plane. The outer clamp 2 is annular and the inner clamp may be annular, or cup- or disk-shaped. Both clamps are adapted to be rotated about a common axis A—A.

One of the ring clamps, for instance the clamp 2, is adapted to be driven about the axis A—A by a driving means of any kind. Preferably the driving means comprise a worm wheel 4, which is cut in the periphery of the body of jaw 2a of the outer clamp. Said worm wheel engages a worm 5 which is adapted to be rotated by means of a hand wheel or a crank (as shown at 24, 25 in Figs. 2 and 3).

The jaw 3a of the other clamp is connected with a device which gives an increasing resistance when being rotated. This device consists of an arm 6 to which a weight 7 is fixed. Instead hereof other devices may be applied, e. g. a torsion spring or a mechanism consisting of an arm, the displacement of which being counteracted by a tension spring or by a compression spring.

The paper which is clamped between both clamps acts as a coupling means between the outer clamp and the inner clamp, so that upon rotation of the clamp 2, the movement of this clamp is transmitted to the inner clamp 3 only by means of the sample strip. When the clamp 3 is rotated the arm 6 with the weight 7 deviates, so that an increasing resistance is exerted on the clamp 3.

The transmission of the movement is interrupted when the resistance exerted on the clamps 3 has increased to such a degree that the annular portion of the test strip which connects both clamps and which has a width of 0.04 to 0.08 in. ruptures. The deviation of the weight arm may be read off on a scale. The maximum force at the moment of rupture of the test strip gives a value for determining the strength of the paper or the like.

With reference to Figs. 2–3 the apparatus consists of a base plate 11 which is carried by one fixed support 12 and three supports 13 which are adjustable by means of screws with knurled heads 14. A water-level 15 gives an indication whether the base plate has been rightly adjusted.

A column 16 is fixed on the base plate 11 by means of screws 17. This column forms a support for the driving mechanism, the clamps, the weight arm and the scale.

In the upper part of the column a sleeve 10 has been pressed in order to act as a bearing for the outer clamps 2a, the axial movement of which being prevented by a collar 18 and a ring nut 19 which is screwed on the left hand portion (Fig. 4) of the part 2a. A worm wheel 4 has been cut in the periphery of the part 2a, so that said part may be driven by the following device.

A boss 20 of the column 16 carries a rotatable shaft 21 which is supported in bearings 22 and 23. On the outer end of said shaft a hand wheel 24 with a grip 25 is fixed, while the inner end of said shaft is formed as a bevel pinion 26. This pinion engages a second pinion 27 which is fixed on a vertical shaft 28. This shaft is rotatably supported in the column 16 and bears, near its upper end a worm 29 which engages the worm wheel 4. The shaft 28 is guided in bearings 30, 31 and 32, last-mentioned bearing being enclosed in a removable bushing 33 which has an outwardly extending flange 34 by means of which it is fixed by screws 35 to a milled face at the top of the column 16. The axial reaction of the worm 29 is taken by a thrust bearing 36. An opening 37 in the column 16 is closed by a removable cover 38 and serves to facilitate assembly and inspection of the pinions 26 and 27 and of their shafts.

A cylindrical sleeve 39 is fixed on the right hand portion of the part 2a. To this purpose the cylindrical sleeve 39 is provided, at its left hand end, with an internally extending flange 40 which fits a cylindrical surface 41 of the member 2a. The flange 40 has two opposite notches 40a (vide Fig. 7) which form passages for lugs 42 of the member 2a. After assembly of the cylindrical member and its parts which are described here below, the member 39 is shifted over the member 2a, care being taken that the lugs 42 pass the notches in the flange 40, and thereupon the member 39 is turned 90° and the two parts are prevented from rotation relatively to each other by means of a set screw 43.

The clamping ring 2b is provided with crescent shaped lugs 42a fitting around the lugs 42 of member 2a (vide Fig. 8) such that member 2b can be axially displaced with respect to member 2a. The crescent shaped lugs 42a are provided with apertures 42b to enable the insertion of the test strip between the clamps 2 and 3. A sleeve 44 is provided with external screwthread 45, engaging internal screwthread of the member 39. Radial pegs 44a in sleeve 44 engage a ring nut 44b in member 2b, such that upon rotation of sleeve 44 member 2b is not rotated but only the axial movement of sleeve 44 is communicated to said member 2b. Four grips 46 are screwed in oblique holes 47 in the sleeve 44. By turning the grips 46 the sleeve 44 and therewith the clamping ring 2b can be axially displaced to the right. Then the jaws 2a and 2b are opened and during such movement the flange 44c contacts with a cylinder 56 and moves the latter also to the left, such that the jaws 3a and 3b are also opened. Upon turning grips 46 in the reverse direction the sleeve 44 moves to the left in Fig. 4. The jaws 3a and 3b are closed by other means to be described hereinafter. The cylindrical member 39 has two opposite slots 48 through which a test strip of paper may be inserted between the clamping rings.

A horizontal shaft 49 is supported by means of ball bearings 50 and 51 within the part 2a, said bearings being spaced by a bushing 52. The right hand end of the shaft 49 is enlarged to form the part 3a of the inner clamp. The middle of the end face of the shaft 49 is cut away in order to leave a narrow annular clenching face. The reaction of the clenching force is taken by a thrust bearing 53, while a second thrust bearing 54 prevents any axial movement of the shaft 49. Said shaft 49 may be adjusted in axial direction by means of a screw bush 55 in order to take care that the end faces of the clamping rings 2a and 3a are exactly in the same plane. An arm 6 carrying a weight 7, is fixed on the left end of the shaft 49.

A cylinder 56 is slidable within the sleeve 44 and is prevented from rotation therein by means of the end of a set screw 57 engaging a longitudinal groove 58 in the periphery of the cylinder 56. By means of ball bearings 59 and 60 the cylinder 56 supports a shaft 61, the left hand end of which forms the ring 3b of the inner clamp, the end face is equally cut out to form an annular end face.

Two arms 62 and 63 are formed integrally with the arm 6 and carry the ends of rods 64 and 65, the other ends of which being connected by a yoke 66. The center part of the yoke 66 forms a boss 67 which engages a screw 68. The head 69 of this screw is provided with a cross bar 70 which serves as a grip. The other end has a cavity enclosing a steel ball 71 which acts as a thrust bearing against the shaft 61. It is clear, that when the test strip of paper is inserted between the clamping rings 3a and 3b and the screw 68 is tightened by means of the cross bar 70, the reaction is taken by the arms 62 and 63, the rods 64 and 65 and the yoke 66.

The arm 6 which is of T-shape section, is locked in its vertical position by means of a locking device consisting of a fork 72 which engages the web of the T-section and which is rotatably supported by a bracket 73 of the column 16. A crank 74 on the pivot pin 75 of the fork 72 makes it possible to turn the fork 72 either in the locking position or in the release position.

The column 16 carries by means of a bracket 76 a curved toothed bar 77 and a curved bar 78 of L-section which at its upper face of the outer web is provided with a scale 79. A pointer 80 is fixed to the arm 6 and follows the scale 79 when the arm swings with the shaft 49. At the back of the arm 6 five pawls 81 are pivotally carried by a pin 82 and are urged into engagement with the toothed rack 77 by means of leaf springs 83. The pointed ends of the pawls 81 (vide Fig. 6) which engage the teeth of the rack 77 are slightly staggered in such a way, that the differences in length of the pointed ends are one sixth of the pitch of the teeth of the rack 77.

The apparatus described hereabove functions in the following way:

The apparatus is adjusted in the exact horizontal position of the base plate 11 by means of the screws 14 and the water level 15. The screw 68 is loosened by turning cross bar 70. Thereupon the outer clamp 2a, 2b and the inner clamp 3a, 3b are opened by means of the grips 46 as described above. Now a test strip of paper is inserted between the clamps through the slots 48 in the cylindrical member 39 and the clamps are tightened by means of the grips 46 and the cross bar 70.

It is to be noted that upon tightening the clamps no torsion is exerted on the strip of paper, because relative rotation of the clamping jaws is prevented.

The crank 74 is turned in order to release the arm 6.

Now the outer clamping ring 2a is turned by means of the hand wheel 24, the shaft 21, the bevel pinions 26 and 27, the shaft 28, the worm 29 and the worm wheel 4. This rotational movement is transmitted by the test strip to the inner clamp 3a, 3b so that the shaft 49, and therewith the arm 6 and the weight 7, is rotated in the same direction and to the same amount. Thereby the arm 6 is deviated and the increase of the angle between the arm 6 and the vertical involves an increase of the resistance against this movement. At a given moment this resistance is so great that the paper ruptures between the clamps 2 and 3. The arm 6 is not moved any farther but tends to fall back to the vertical position. However, this return movement is prevented by the pawls 81, so that the arm 6 remains in the position in which it was when the rupture of the paper had taken place. In consequence of the fact that the points of the pawls 81 are staggered (vide Fig. 6) the maximum return movement of the arm 6 after rupture of the paper is one sixth of the pitch of the rack 77. This pitch being for instance ⅛ in. the maximum return movement is only about 0.02 in. The position of the arm 6 may be read off on the scale 79 by means of the pointer 80 and this gives an indication of the strength of the paper.

Comparative experiments between the usual way for determining the tensile strength on one hand, and the measuring method according to the invention on the other hand, have shown that the deviations from an average value when making a number of separate tests according to the invention are remarkably lower than those obtained by the usual method for testing paper.

Having now described my invention and the objects thereof, what I claim is:

1. In a device for testing paper and other foliaceous materials, two concentric clamping members, means for rotatably supporting the two clamping members on a common axis, the clamping members clamping the material to be tested in a plane perpendicularly to the common rotation axis of the two clamping members in such a manner that an annular portion of the material is exposed between the two concentric clamping members, the annular portion of the material transmitting the rotary force of one of the clamping members to the other clamping member, means for rotating one of the clamping members, and means for indicating the force exerted on the annular portion of the material to be tested when transmitting the rotary movement to the other clamping member.

2. The device as set forth in claim 1, in which each clamping member comprises two oppositely arranged jaws and which includes means for moving at least one of the jaws of each clamping member in axial direction, in order to clamp the material to be tested between the jaws of each clamping member.

3. In a device for testing paper and other foliaceous material, a first shaft having two branches, a second shaft having two branches, means for supporting the first and second shaft in coaxial arrangement, a first clamping member comprising two oppositely arranged jaws each secured to the respective branches of the first shaft, a second clamping member comprising two oppositely arranged jaws each secured to the respective branches of the second shaft, means for rotating one of the shafts, means for moving one branch of each shaft in axial direction to its other branch in order to clamp the material to be tested between the jaws of the clamping members in such a maner that an annular portion of the material is exposed, which portion is adapted to transmit the rotary movement of one of the clamping members to the other clamping member, means for locking one branch of each shaft against relative rotation of its other branch, and means for indicating the force exerted on the annular portion of the material to be tested when transmitting the rotary movement to the other clamping member.

4. The device as set forth in claim 3, in which the indicating means comprise a pointer arm secured to and rotating with the shaft carrying the other clamping member.

5. The device as set forth in claim 4, including a plurality of pawls, means for pivoting the pawls to the pointer arms, in order to move the pawls together with the pointer arm upon rotating the other clamping member, a toothed bar, means for supporting the toothed bar, means for causing engagement of the pawls with the toothed bar, in order to permit free movement of the pointer arm in one direction but blocking its unvoluntary movement in the opposite direction and thereby indicating the point of rupture of the material to be tested.

6. The device as set forth in claim 5, in which the ends of each pawl are staggered relative to the adjacent pawl, in order to limit the return movement of the pointer arm upon rupture of the annular portion of the material to be tested.

ARNOLDUS J. J. M. van der KORPUT.

REFERENCES CITED

The following references are of record in the file of this patent:

UNITED STATES PATENTS

| Number | Name | Date |
|---|---|---|
| 1,193,686 | Heisler | Aug. 8, 1916 |
| 1,559,466 | Schopper | Oct. 27, 1925 |
| 1,884,388 | Thwing | Oct. 25, 1932 |
| 1,989,625 | Nichols | Jan. 29, 1935 |

FOREIGN PATENTS

| Number | Country | Date |
|---|---|---|
| 100,052 | Germany | Nov. 3, 1898 |
| 121,515 | Austria | Feb. 25, 1931 |